US010258948B2

(12) United States Patent
Ito et al.

(10) Patent No.: US 10,258,948 B2
(45) Date of Patent: Apr. 16, 2019

(54) ATOMIZER, SPRAY-DRYING APPARATUS, AND METHOD FOR MANUFACTURING COMPOSITE PARTICLES

(71) Applicant: ZEON CORPORATION, Chiyoda-ku, Tokyo (JP)

(72) Inventors: Keisuke Ito, Tokyo (JP); Takuya Ishii, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 127 days.

(21) Appl. No.: 15/501,937

(22) PCT Filed: Aug. 21, 2015

(86) PCT No.: PCT/JP2015/073472

§ 371 (c)(1),
(2) Date: Feb. 6, 2017

(87) PCT Pub. No.: WO2016/031692

PCT Pub. Date: Mar. 3, 2016

(65) Prior Publication Data

US 2017/0239632 A1 Aug. 24, 2017

(30) Foreign Application Priority Data

Aug. 28, 2014 (JP) ................................. 2014-174158
Aug. 28, 2014 (JP) ................................. 2014-174159
(Continued)

(51) Int. Cl.
*B01D 1/18* (2006.01)
*B01D 1/20* (2006.01)
(Continued)

(52) U.S. Cl.
CPC ..................................... *B01J 2/04* (2013.01); *B01D 1/18* (2013.01); *B01D 1/20* (2013.01); *B05B 3/10* (2013.01);
(Continued)

(58) Field of Classification Search
None
See application file for complete search history.

(56) References Cited

U.S. PATENT DOCUMENTS 2,220,275 A * 11/1940 Preston ................. B05B 3/1007
159/4.2
2,831,652 A * 4/1958 Gemperle .................. B01J 2/04
159/4.2
(Continued)

FOREIGN PATENT DOCUMENTS

EP 0109224 A2 5/1984
EP 0469725 A1 2/1992
(Continued)

OTHER PUBLICATIONS

Nov. 24, 2015, International Search Report issued in the International Patent Application No. PCT/JP2015/073472.
(Continued)

*Primary Examiner* — Mary Lynn F Theisen
(74) *Attorney, Agent, or Firm* — Kenja IP Law PC

(57) ABSTRACT

A nozzle part dropping a slurry and a rotary disk centrifugally spraying the slurry to be dropped from the nozzle part are included. The rotary disk includes a plurality of grooves stretching in a radiation direction at least in a periphery part of a surface on which the slurry is sprayed.

15 Claims, 15 Drawing Sheets

(30) Foreign Application Priority Data

| | | |
|---|---|---|
| Aug. 28, 2014 | (JP) | 2014-174160 |
| Feb. 23, 2015 | (JP) | 2015-033078 |

(51) Int. Cl.

| | |
|---|---|
| ***B01J 2/04*** | (2006.01) |
| ***B05B 3/10*** | (2006.01) |
| ***F26B 3/12*** | (2006.01) |
| ***H01M 4/1393*** | (2010.01) |

(52) U.S. Cl.

CPC .......... *B05B 3/1007* (2013.01); *B05B 3/1014* (2013.01); *B05B 3/1021* (2013.01); *F26B 3/12* (2013.01); *H01M 4/1393* (2013.01)

(56) References Cited

U.S. PATENT DOCUMENTS

| | | | | |
|---|---|---|---|---|
| 5,279,708 | A | 1/1994 | Wood et al. | |
| 2015/0247725 | A1* | 9/2015 | Jung | B05B 9/01<br>239/589 |

FOREIGN PATENT DOCUMENTS

| | | | |
|---|---|---|---|
| GB | 2008439 | A | 6/1979 |
| JP | S5472512 | A | 6/1979 |
| JP | S54127856 | U1 | 9/1979 |
| JP | S5982957 | A | 5/1984 |
| JP | S59230652 | A | 12/1984 |
| JP | S60179129 | A | 9/1985 |
| JP | 2006043555 | A | 2/2006 |
| JP | 2011213496 | A | 10/2011 |
| JP | 2012143983 | A | 8/2012 |
| JP | 2013166974 | A | 8/2013 |

OTHER PUBLICATIONS

Feb. 28, 2017, International Preliminary Report on Patentability issued in the International Patent Application No. PCT/JP2015/073472.

Mar. 6, 2018, Extended European Search Report issued by the European Patent Office in the corresponding European Patent Application No. 15837064.3.

* cited by examiner

ATOMIZER, SPRAY-DRYING APPARATUS, AND METHOD FOR MANUFACTURING COMPOSITE PARTICLES

TECHNICAL FIELD

The present invention relates to an atomizer centrifugally spraying slurry, a spray-drying apparatus including the atomizer, and a method for manufacturing composite particles used for manufacturing an electrode for an electrochemical device.

BACKGROUND ART

Conventionally, a method using an atomizer with a pin type rotary disk has been known in a spray-drying granulation method, one of the methods for manufacturing particles. For example, Patent Literature 1 discloses a spray part that constitutes an atomizer. The spray part includes a slurry hose discharging a slurry and a pin type rotary disk centrifugally spraying the slurry. The pin type rotary disk herein includes a doughnut-shaped upper board, a planar circular-shaped lower board, and a plurality of dispersing pins arranged in a circumferential direction in an outer circumference of an upper surface of the lower board. The dispersing pins connect the upper board and the lower board. In a spray-drying apparatus disclosed in Patent Literature 1, the slurry discharged from the slurry hose is dropped on the surface of the lower board of the rotating rotary disk. The slurry moves to the outer circumference of the surface of the lower board by centrifugal force due to rotation of the rotary disk and is sprayed from the rotary disk through the dispersing pins. The sprayed slurry is then dried with hot air so as to obtain particles.

CITATION LIST

Patent Literature

Patent Literature 1: JP 2006-43555 A

SUMMARY OF INVENTION

Technical Problem

As mentioned above, a typical example of the conventional atomizer includes an atomizer provided with a pin type rotary disk including an upper board, a lower board, and a plurality of pins connecting these boards. However, the slurry dropped from a nozzle part does not spread uniformly on a planar surface of the lower board so that an amount of the slurry to be sprayed may not be uniform. Furthermore, as the slurry is centrifugally sprayed from various points between the pins, for example, from a bottom end or a top end of each pin, there is a problem that a size of a droplet of the slurry may not be uniform. Therefore, there are problems that a particle size of particles to be manufactured may not be uniform and that particle size distribution may not be sharp.

Further, the lower board has a disk-like shape and the slurry is centrifugally sprayed from an edge part of the lower board, so that some slurry may not be centrifugally sprayed from the pin type rotary disk but fixes to a side surface part of the lower board. Similarly, some slurry may not be centrifugally sprayed from the pin type rotary disk but fixes to, for example, the bottom end and the top end of each pin or to a back surface of the upper board. Therefore, there are problems that the pin type rotary disk gets clogged and that the fixing slurry peels off and gets mixed in granulated particles.

An object of the present invention is to provide an atomizer capable of preventing deviation in particle size of the granulated particles and capable of obtaining sharp particle size distribution, a spray-drying apparatus including the atomizer, and a method for manufacturing composite particles used for manufacturing an electrode for an electrochemical device using the atomizer.

Solution to Problem

The present inventors have studied intensely and have found that the above-mentioned object can be achieved by removing an upper board and a pin from a rotary disk and forming a plurality of grooves stretching in a radiation direction at least at a periphery part of a surface of the rotary disk (lower board) where slurry is sprayed, thereby completed the present invention.

In other words, according to the present invention, there are provided:

(1) an atomizer including a nozzle part dropping a slurry and a rotary disk centrifugally spraying the slurry to be dropped from the nozzle part, in which the rotary disk includes a plurality of grooves stretching in a radiation direction at least in a periphery part of a surface on which the slurry is sprayed;

(2) the atomizer according to (1), in which the rotary disk has a disk-like shape and includes an annular inclined surface inclining in a radiation direction, the inclined surface being formed around a central portion of the disk-like shape and having a predetermined angle relative to a horizontal direction;

(3) the atomizer according to (2), in which the rotary disk includes a liquid reservoir part reserving the slurry at least around a central portion of an upper surface of the disk-like shape;

(4) the atomizer according to any one of (1) to (3), in which a surface which has the plurality of grooves is on an upper surface of the rotary disk;

(5) the atomizer according to any one of (1) to (3), in which a surface which has the plurality of grooves is on a lower surface of the rotary disk, and the rotary disk includes twenty or more holes circumferentially arranged and penetrating from an upper surface of the rotary disk to the lower surface;

(6) the atomizer according to any one of (1) to (5), in which each of the grooves has a width equal to or more than 50 μm and equal to or less than 5 mm and has a depth equal to or more than 50 μm and equal to or less than 5 mm;

(7) the atomizer according to any one of (1) to (6), in which a linear velocity of the slurry to be dropped from the nozzle part is equal to or more than 50 m/min;

(8) the atomizer according to any one of (1) to (7), in which a/b is equal to or more than 0.8, where "a" represents a width of each of the grooves and "b" represents a pitch of adjacent grooves;

(9) the atomizer according to any one of (1) to (8), in which the rotary disk is coated with a water repellent material;

(10) the atomizer according to any one of (1) to (8), in which the rotary disk is coated with a water repellent material and a material having higher abrasion resistance than a material used for forming the rotary disk;

(11) the atomizer according to (2), in which a difference in a vertical direction between a position on which the slurry is dropped from the nozzle part and a lowest position of the inclined surface or a highest position of the inclined surface is equal to or more than 1 mm;

(12) the atomizer according to (2) or (11), in which the inclined surface is a curved surface;

(13) the atomizer according to (3), in which the liquid reservoir part is an annular concave portion;

(14) the atomizer according to any one of (1) to (13), in which the slurry is a slurry for composite particles for dry molding used for manufacturing an electrode for an electrochemical device;

(15) a spray-drying apparatus including the atomizer according to any one of (1) to (14) and a drying furnace drying the slurry centrifugally sprayed from the atomizer; and

(16) a method for manufacturing composite particles using the atomizer according to any one of (1) to (14), the method including: a spraying step of centrifugally spraying a slurry for composite particles for dry molding used for manufacturing an electrode for an electrochemical device; and a drying step of drying the slurry centrifugally sprayed in the spraying step.

Advantageous Effects of Invention

According to the present invention, it is possible to provide an atomizer capable of preventing deviation in particle size of granulated particles and capable of obtaining sharp particle size distribution, a spray-drying apparatus including the atomizer, and a method for manufacturing composite particles used for manufacturing an electrode for an electrochemical device using the atomizer.

DESCRIPTION OF EMBODIMENTS

Figure 1:
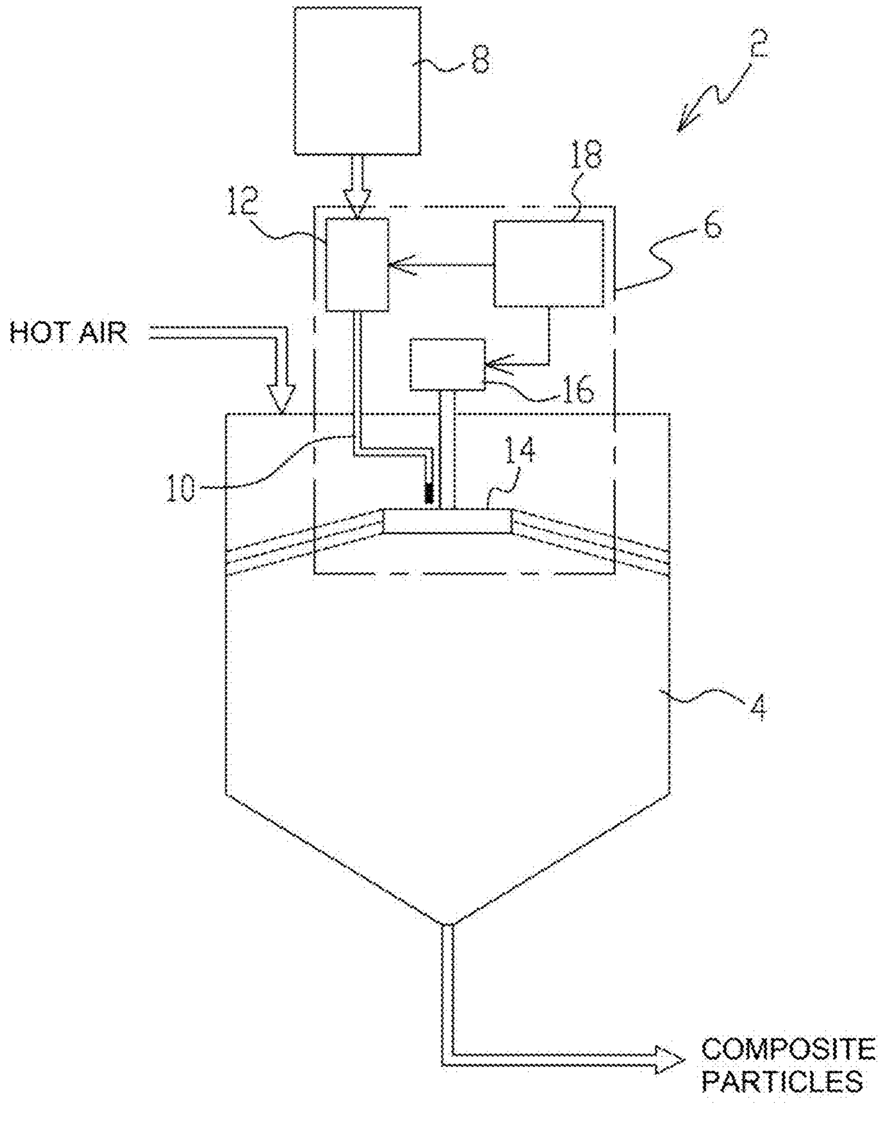
FIG. 1 is a schematic view illustrating a spray-drying apparatus according to an embodiment of the present invention.

Hereinafter, an atomizer according to an embodiment of the present invention, a spray-drying apparatus including the atomizer, and a method for manufacturing composite particles used for manufacturing an electrode for an electrochemical device are described with reference to drawings. FIG. 1 is a schematic view illustrating a spray-drying apparatus according to the embodiment of the present invention. As illustrated in FIG. 1, a spray-drying apparatus 2 includes a drying furnace 4 which dries a dropped slurry with hot-air.

Above the drying furnace 4, an atomizer 6 which centrifugally sprays the slurry inside the drying furnace 4 and a slurry feeding part 8 which feeds the slurry to the atomizer 6 are provided. The atomizer 6 is configured to include a nozzle part 10, a valve driving part 12, a rotary disk 14, a motor 16, and a control part 18.

The nozzle part 10 drops the slurry fed from the slurry feeding part 8 on the rotary disk 14. The valve driving part 12 opens and closes a valve (not illustrated) for adjusting an amount of the slurry to be dropped from the nozzle part 10. The disk-shaped rotary disk 14 (see FIG. 2) rotates so as to centrifugally spray the slurry to be dropped from the nozzle part 10 on a disk-shaped upper surface in a vicinity of a central portion. The motor 16 rotates the rotary disk 14. The control part 18 controls drive of the valve driving part 12 and the motor 16 so as to control the amount of the slurry to be dropped from the nozzle part 10 as well as a rotation speed of the rotary disk 14.

In this embodiment, the control part 18 controls the drive of the valve driving part 12 so that a linear velocity of the slurry to be dropped from the nozzle part 10 becomes equal to or more than 50 m/min. The reason is that if the linear velocity of the slurry is less than 50 m/min, the slurry cannot be fed as spreading over an inclined surface 14*a* (see FIG. 2) of the rotary disk 14. Herein, the linear velocity of the slurry is determined by a diameter of a portion in the nozzle part 10 which feeds the slurry (hereinafter referred to as a nozzle diameter) and by a flow rate of the slurry to be fed from the nozzle part 10. Note that, the nozzle diameter and the flow rate of the slurry are preferably small in a case, for example, where a diameter of the rotary disk is small, where processing performance of the rotary disk such as the rotation speed is low, and where drying performance of the drying furnace is low. For example, the nozzle diameter is preferably equal to or less than 1.8 mm, more preferably equal to or less than 1 mm, and further more preferably equal to or less than 0.8 mm in a case where the rotary disk 14 has a diameter of 50 mm and where the drying performance (an amount of evaporated water per unit time) of the drying furnace 4 is ranging from 10 to 50 g/min.

However, when the nozzle diameter is smaller than a size of filler included in the slurry, there is a possibility that the nozzle part 10 gets clogged. Furthermore, when the nozzle diameter is made extremely small, high pressure is required in feeding the slurry from the slurry feeding part 8, which may lead to abrade the nozzle part 10. Accordingly, the nozzle diameter is preferably equal to or more than 0.3 mm. Note that, the atomizer 6 according to the embodiment includes one nozzle part 10. However, it should be noted that the atomizer 6 may include a plurality of nozzle parts. In such a case, it is preferable that each nozzle diameter is made smaller than in a case where one nozzle part is included. Herein, each nozzle diameter is adjusted so that the slurry is fed from every nozzle at the linear velocity equal to or more than 50 m/min.

The nozzle diameter of the nozzle part 10 can be adjusted by inserting a silicon tube and the like into a tube that constitutes the nozzle part 10. For example, when the tube (an existing tube) that constitutes the nozzle part 10 has an external diameter of 4 mm and an internal diameter of 3 mm. The nozzle diameter can be changed from 3 mm to 1 mm by inserting a silicon tube having an external diameter of 3 mm and an internal diameter of 1 mm into the existing tube. Furthermore, the nozzle diameter can be changed from 1 mm to 0.5 mm by inserting a silicon tube having an external diameter of 1 mm and an internal diameter of 0.5 mm into the silicon tube having the external diameter of 3 mm and the internal diameter of 1 mm.

Figure 2:
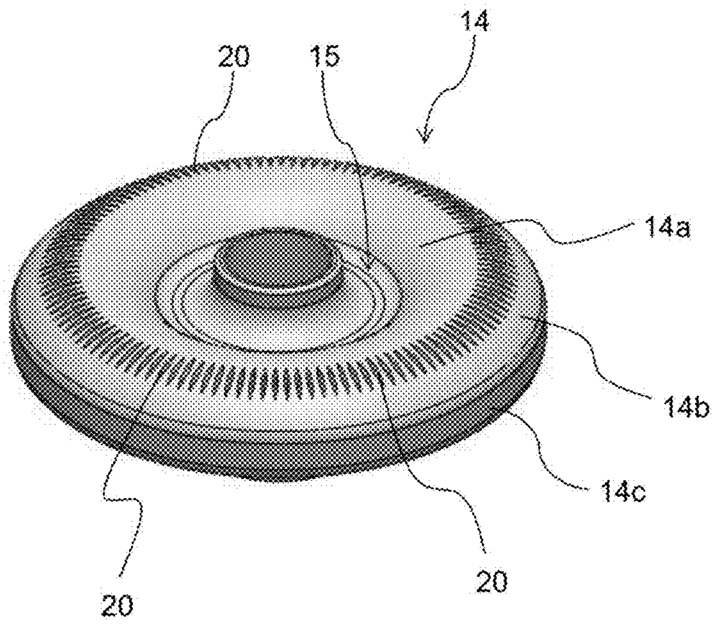
FIG. 2 is a view illustrating a configuration of a rotary disk according to the embodiment of the present invention.

FIG. 2 is a view illustrating a configuration of the rotary disk 14. As illustrated in FIG. 2, the rotary disk 14 is formed with annular inclined surfaces 14*a*, 14*b* in an upper surface of the rotary disk 14. Each of the inclined surfaces 14*a*, 14*b* inclined in a radiation direction is formed around a central portion of the rotary disk 14 and has a predetermined angle relative to a horizontal direction. The inclined surface 14*a* is an annular inclined and curved surface ascending in the radiation direction from the central portion of the rotary disk 14. The inclined surface 14*b* is an annular inclined and curved surface disposed in an outer circumference of the inclined surface 14*a* and descending in the radiation direction from the central portion of the rotary disk 14. In other words, the inclined surface 14*a* is the annular surface inclined in the radiation direction and is disposed around the central portion of the disk-like shape of the rotary disk 14. The inclined surface 14*a* further has the predetermined angle relative to a vertical surface direction to a rotation axis of the rotary disk 14 (normally, in the horizontal direction) at least from a position where the slurry is dropped to a position where the slurry is sprayed.

The vicinity of the central portion in the upper surface of the rotary disk 14 is an annular concave portion surrounded by the inclined surface 14*a* and constitutes a liquid reservoir part 15 reserving the slurry dropped from the nozzle part 10. In other words, the liquid reservoir part 15 is formed between the position in the rotary disk 14 where the slurry is dropped and grooves 20 disposed in a periphery part of the rotary disk 14. The liquid reservoir part 15 may temporarily reserve the slurry which moves in an outer circumferential direction of the rotary disk 14 due to centrifugal force. Furthermore, the liquid reservoir part 15 is the annular concave portion and is formed between an annular inclined portion (the inclined surface 14*a*) and the central portion of the rotary disk 14. Herein, the annular inclined portion has an angle gradually increasing with respect to a surface perpendicular to the rotation axis of the rotary disk 14.

As illustrated in FIG. 2, in the periphery part of the upper surface of the rotary disk 14, that is, in an upper part of the annular inclined surface 14*b*, a plurality of grooves 20 stretching in the radiation direction is formed at regular intervals. Each groove 20 has a constant width and a constant depth. Further, a surface of the rotary disk 14 is coated with DLC (water repellent ICF) imparted with water repellency by doping an intrinsic carbon film (ICF) with fluorine.

The slurry dropped from the nozzle part 10 at the linear velocity equal to or more than 50 m/min is dropped on the upper surface in the vicinity of the central portion of the rotary disk 14. The slurry dropped on the upper surface in the vicinity of the central portion of the rotary disk 14 and temporarily reserved in the liquid reservoir part 15 disposed in the vicinity of the central portion of the rotary disk 14 ascends as spreading uniformly over the inclined surface 14*a* by the centrifugal force due to rotation of the rotary disk 14. The slurry ascending the inclined surface 14*a* is not sprayed in the horizontal direction at a connection part where the inclined surface 14*a* and the inclined surface 14*b* are smoothly connected because of force in the radiation direction due to the centrifugal force and downward force due to surface tension of the slurry. However, the slurry passes through the grooves 20 formed in the upper part of the inclined surface 14*b* and is centrifugally sprayed in a downward direction at a predetermined angle relative to the horizontal direction as illustrated in FIG. 1.

The slurry temporarily reserved in the liquid reservoir part 15 in the vicinity of the central portion of the rotary disk 14 ascends as spreading uniformly over the inclined surface 14*a*. Therefore, an amount of the slurry centrifugally sprayed from the rotary disk 14 is stabilized and thus particle size of granulated particles to be manufactured will be stabilized. Furthermore, the inclined surface 14*b* is a curved surface so that the slurry is sprayed before reaching a connection part between a bottom part of the inclined surface 14*b* and a side part of the rotary disk 14. Accordingly, it is possible to prevent some slurry from fixing to the side part 14*c* of the rotary disk 14 without being centrifugally sprayed from the rotary disk 14. Furthermore, the surface of the rotary disk 14 is coated with the water repellent ICF so that wettability of the slurry with respect to the rotary disk 14 is weak, which leads to prevent the slurry from adhering to the surface of the rotary disk 14.

Herein, a difference in a vertical direction between a position on the upper surface in the vicinity of the central portion of the rotary disk 14 where the slurry is dropped from the nozzle part 10 and the highest position of the inclined surface 14*a* is preferably equal to or more than 1 mm. The reason is that if the difference is smaller than 1 mm, the slurry cannot uniformly spread over the inclined surface 14*a* but bursts out from the rotary disk 14 in a form of a liquid, not a fine powder (mist), and adheres to an internal wall of the drying furnace 4 before dried inside the drying furnace 4 so that the composite particles cannot be obtained.

Further, the grooves 20 control the amount of the slurry centrifugally sprayed from the rotary disk 14 as the slurry passing through the grooves 20. In other words, since the slurry passes through the plurality of grooves 20 each having the constant width and the constant depth, the amount of the slurry centrifugally sprayed from the rotary disk 14 is stabilized and the particle size of the granulated particles to be manufactured is stabilized. Note that, the grooves 20 are preferably disposed at least in a periphery part of a surface of the rotary disk 14 where the slurry is sprayed (a slurry spraying surface), that is, a surface with a separation point where the slurry is separated from the rotary disk 14 so as to be sprayed. Herein, the "surface where the slurry is sprayed" indicates a surface, among the surfaces of the rotary disk, including the separation point where the slurry is separated from the rotary disk and made into mist (droplets). The plurality of grooves stretching in the radial direction is formed at least in the periphery part of such a surface and the slurry is sprayed through the grooves. Note that, a surface where the slurry to be dropped from the nozzle, that is, a surface where the slurry is brought into contact with the rotary disk for the first time may be different from the surface where the slurry is sprayed. In such a case, for example, both surfaces are connected through a through hole and the like so that the dropped slurry passes through the through hole and moves to the surface where the slurry is sprayed, and then the slurry is sprayed through the grooves.

Specifically, if the upper surface where the slurry is dropped is the slurry spraying surface, the grooves 20 are preferably disposed in the periphery part of the upper surface. Alternatively, if a surface other than the upper surface where the slurry is dropped (for example, a back surface of the upper surface where the slurry is dropped or a side surface of the rotary disk 14) is the slurry spraying surface, the grooves 20 are preferably disposed in a periphery part of the surface other than the upper surface. Further, the grooves 20 are preferably disposed in the periphery part and also in a position close to the position where the slurry is sprayed within a slurry flow path ranging from the position where slurry is dropped to the position where the slurry is sprayed.

Further, it is possible to control the amount of the slurry to be centrifugally sprayed from the rotary disk 14 by changing the width and the depth of each groove 20. As a result, it is possible to control the particle size of the granulated particles to be manufactured. In other words, it is possible to decrease (increase) the amount of the slurry to be centrifugally sprayed from the rotary disk 14 by decreasing (increasing) the width and the depth of each groove 20. Therefore, it is possible to achieve decrease (increase) in the particle size of the granulated particles to be manufactured.

Herein, each groove 20 has a width equal to or more than 50 μm and equal to or less than 5 mm, a depth equal to or more than 50 μm and equal to or less than 5 mm. Preferably, the width is equal to or more than 150 μm and equal to or less than 2 mm, the depth is equal to or more than 50 μm and equal to or less than 1 mm. More preferably, the width is equal to or more than 250 μm and equal to or less than 1 mm, and the depth is equal to or more than 300 μm and equal to or less than 1 mm. The reason is that if each groove 20 has a width less than 50 μm and a depth less than 50 μm, the slurry cannot pass through the grooves 20. Alternatively, if each groove 20 has a width more than 5 mm and a depth more than 5 mm, the amount of the slurry to be centrifugally sprayed, that is, the particle size of the granulated particles may not be uniform.

The slurry used in the spray-drying apparatus 2 may include electrode active materials and solvents. The slurry may also include binders, dispersing agents, electroconductive materials, and additives if necessary. Furthermore, the slurry herein can be widely applied to slurry which may be raw materials of the granulated particles to be manufactured by spray-drying. Examples of such slurry include foods, pharmaceuticals, and agricultural chemicals.

In a case where the composite particles are used as electrode materials for lithium ion batteries, examples of the electrode active materials for a positive electrode include metal oxides capable of reversibly doping and dedoping lithium ions. Examples of such metal oxides include lithium cobaltate, lithium nickelate, lithium manganate, and lithium phosphate. Note that, the electrode active materials for a positive electrode mentioned in the above may be used alone, or may also be used by mixing a plurality of kinds thereof appropriately depending on the application.

Note that, examples of the electrode active materials for a negative electrode as the counter electrode of a positive electrode for the lithium ion batteries include low crystalline carbons (amorphous carbons) such as easily graphitizable carbon, hardly graphitizable carbon, and pyrolytic carbon, graphite (natural graphite, artificial graphite), alloy-base materials of tin, silicon, or the like, and oxides such as silicon oxides, tin oxides, and lithium titanate. Note that, the electrode active materials for a negative electrode mentioned in the above may be used alone, or may also be used by mixing a plurality of kinds thereof appropriately depending on the application.

For example, a volume average particle size of the electrode active materials for an electrode for lithium ion batteries is normally 0.1 to 100 μm, preferably 0.5 to 50 μm, and more preferably 0.8 to 30 μm, for both the positive electrode and the negative electrode.

As the solvents included in the slurry, water is preferably used, and a mixed solvent of water and an organic solvent may also be used. One of only the organic solvents may be used alone, or several kinds thereof may be used in combination. Examples of the organic solvents usable in this case include alcohols, alkylketones, ethers, and amides. When an organic solvent is used, alcohols are preferable. By using water with an organic solvent having a boiling point lower than that of water together, a drying speed during drying can be accelerated. Moreover, this makes it possible to adjust viscosity and fluidity of the slurry, and to improve manufacturing efficiency.

The binders used for the composite particles are not particularly limited as long as the binders can bind the electrode active materials to each other. Preferable binders are dispersion type binders having a property of being dispersed in a solvent. Examples of the dispersion type binders include polymer compounds such as silicon-based polymers, fluorine-containing polymers, conjugated diene-based polymers, acrylate-based polymers, polyimide, polyamide, or polyurethane, preferably include the fluorine-containing polymers, the conjugated diene-based polymers, or the acrylate-based polymers, more preferably include the conjugated diene-based polymers and the acrylate-based polymers.

A volume average particle size of the composite particles is within a range of normally 0.1 to 1000 μm, preferably 1 to 500 μm, more preferably 30 to 250 μm from a viewpoint of easily obtaining an electrode active material layer having intended thickness.

Note that, the average particle size of the composite particles is a volume average particle size measured and calculated by a laser diffraction type particle size distribution measuring apparatus (for example, SALD-3100, manufactured by Shimazu Corporation).

In a case of granulating composite particles for dry molding used for manufacturing an electrode for an electrochemical device with using this spray-drying apparatus 2, first, the slurry is fed from the slurry feeding part 8 to the nozzle part 10. The slurry is then dropped from the nozzle part 10 on the upper surface in the vicinity of the central portion of the rotary disk 14. Herein, the control part 18 controls the opening and closing of the valve carried out by the valve driving part 12 and adjusts the amount of the slurry to be dropped from the nozzle part 10 so that the linear velocity of the slurry to be dropped from the nozzle part 10 becomes equal to or more than 50 m/min. Note that, a method for feeding the slurry should not be limited to dropping. In a case of feeding the slurry to a lower surface of the rotary disk 14, the slurry may be fed as making the nozzle close to the lower surface of the rotary disk 14. Furthermore, by reducing the diameter of the nozzle which feeds the slurry, it is possible to uniform intermittent liquid feed, which leads to obtain the composite particles with uniform particle size. The slurry fed herein may also be subjected to atomization by the nozzle part 10 and fed as fine droplets. Further, the control part 18 also controls the rotation of the rotary disk 14 carried out by the motor 16 and adjusts the rotation speed of the rotary disk 14. The rotation speed is normally 1,000 to 90,000 rpm.

Next, the slurry dropped on the upper surface in the vicinity of the central portion of the rotary disk 14 is centrifugally sprayed by the centrifugal force due to the rotation of the rotary disk 14. At this time, the slurry is temporarily reserved in the liquid reservoir part 15 in the vicinity of the central portion of the rotary disk 14. The slurry then ascends the inclined surface 14*a* by the centrifugal force due to the rotation of the rotary disk 14. Then, the slurry ascending the inclined surface 14*a* passes through the grooves 20 formed in the upper part of the inclined surface 14*b* and is centrifugally sprayed in the downward direction at the predetermined angle relative to the horizontal direction by the centrifugal force due to the rotation of the rotary disk 14.

In other words, the slurry dropped on the rotary disk 14 is affected by the centrifugal force due to the rotation of the rotary disk 14 and moves in the outer circumferential direction of the rotary disk 14. At this time, the slurry is pressed against the inclined surface 14*a* by the centrifugal force so that the slurry easily and uniformly spreads throughout the inclined surface. Therefore, when the slurry reaches the grooves 20 in the periphery part of the rotary disk 14, each groove is equally fed with the slurry. Since the slurry is uniformly sprayed in the circumferential direction through each groove, the droplets of the slurry are uniform in a size and a shape. Furthermore, the slurry dropped on the rotary disk 14 can spread annually by being temporarily reserved in the liquid reservoir part 15. Therefore, the slurry moving from the liquid reservoir part 15 to an outer circumferential part of the rotary disk 14 can be uniformly spread over the surface of the rotary disk 14 in the whole direction.

Note that, if the inclined surface 14*a* is absent, it may be difficult to completely and uniformly spread the dropped slurry over a disk surface depending on a concentration or a dropping amount of the slurry, rotation speed of the disk, and the like. Furthermore, buoyancy may occur in the vertical direction with respect to the disk surface so that some slurry may not be fed to the grooves 20. Further, if the liquid reservoir part 15 is absent, the dropped slurry is affected by the centrifugal force and spreads in the outer circumferential direction before spreading annually also depending on a concentration or a dropping amount of the slurry, rotation speed of the disk, and the like. As a result, the slurry cannot spread uniformly in the whole direction of the rotary disk 14 but is sprayed only from a partial limited direction.

Accordingly, even though there is the inclined surface 14*a*, if the angle thereof is small or if the dropping amount of the slurry is large, the inclined surface 14*a* alone cannot spread the slurry in the whole direction depending on a concentration of the slurry, rotation speed of the disk, and the like. Therefore, an effect of forming uniform droplets may decrease. Furthermore, if the slurry reaches the grooves 20 without being reserved in the liquid reservoir part 15, the slurry may be fed as exceeding capacity of the grooves 20 depending on a dropping amount. As a result, the slurry may overflow the grooves 20, which decreases the uniforming effect of the droplets.

Next, the droplets of the slurry centrifugally sprayed from the rotary disk 14 are dried by hot air fed inside the drying furnace 4. By drying the droplets of the slurry, the granulated particles, that is, the composite particles for dry molding used for manufacturing an electrode for an electrochemical device are manufactured.

According to the atomizer 6 of the present embodiment, the annular inclined surface 14*a* inclined in the radiation direction is formed on the upper surface of the rotary disk 14. Therefore, the slurry is temporarily reserved in the vicinity of the central portion of the rotary disk 14 and then ascends the periphery part as spreading uniformly. Furthermore, since the plurality of grooves 20 stretching in the radiation direction is formed at the regular intervals in the periphery part of the rotary disk 14, that is, in the upper part of the inclined surface 14*b*, it is possible to prevent deviation in the amount of the slurry centrifugally sprayed from the rotary disk 14. Since the inclined and curved surface 14*b* is formed in the upper surface of the rotary disk 14, the slurry is sprayed before reaching the connection part of the bottom part of the inclined surface 14*b* and the side part of the rotary disk 14. Accordingly, it is possible to prevent some slurry from fixing to the side part 14*c* of the rotary disk 14 without being centrifugally sprayed from the rotary disk 14.

Further, different from a conventional pin type rotary disk, the rotary disk 14 only includes a lower board, but not include an upper board and a pin. Therefore, there is no possibility that some slurry fixes to the upper board or the pin without being centrifugally sprayed from the rotary disk 14. As a result, it is possible to prevent clogging due to the fixation and to prevent the slurry which fixes to and peels off from the upper board or the pin from getting mixed into the granulated particles.

Further, in a case of using a conventional rotary disk such as the pin type rotary disk and rotating the conventional rotary disk at high speed, the slurry dropped toward the lower board strikes against the lower board and bounces. Therefore, in the absence of the pin or the upper board, coarse droplets are discharged as it is into a drying tower so that the droplets cannot be sufficiently dried. Accordingly, in the conventional rotary disk such as the pin type rotary disk, the upper board and the pin are provided so as to prevent the bounced droplets of the slurry from being discharged as it is into the drying tower. However, in such a case, the coarse droplets intermittently adhere to the upper board, the pin, and near the nozzle which feeds liquid. Due to such adhesion, fixation is generated, so that there are many cases where continuous operation cannot be carried out. Therefore, in order to prevent such a problem, it is necessary to adjust viscosity of the slurry.

However, according to the present embodiment, the linear velocity of the slurry to be dropped from the nozzle part 10 is controlled to be equal to or more than 50 m/min so that even though the rotary disk 14 is rotated at high speed, the slurry will not bounce and the slurry can be fed continuously as spreading over the inclined surface 14*a* of the rotary disk 14. Therefore, there is no need to provide the upper board or the pin. Moreover, regardless of the viscosity of the slurry, it is possible to prevent the slurry from fixing to the nozzle part 10 or rotary disk 14. Furthermore, since the slurry can be fed as spreading over the inclined surface 14*a*, it is possible to decrease spraying the coarse droplets. As a result, it is possible to improve a yield of the composite particles to be manufactured and to obtain sharp particle size distribution.

Furthermore, the surface of the rotary disk 14 is coated with the water repellent ICF so that it is possible to improve water repellency and abrasion resistance and to prevent the slurry from fixing to the rotary disk 14. Therefore, even though the spray-drying apparatus 2 is operated for a long time, it is possible to continuously obtain the sharp particle size distribution.

In addition, the slurry ascending the inclined surface 14*a* and passing through the grooves 20 is centrifugally sprayed in the downward direction at the predetermined angle relative to the horizontal direction. Consequently, compared to the conventional art in which the droplets of the slurry are centrifugally sprayed in the horizontal direction, a distance till the droplets of the slurry reaches the internal wall of the drying furnace 4 becomes long so that time of drying the droplets of the slurry becomes long. Therefore, in a case of using the drying furnace 4 having a furnace size identical to that of a conventional spray-drying apparatus, it is possible to manufacture particles having a particle size larger than those manufactured by the conventional spray-drying apparatus. Furthermore, when manufacturing particles having a particle size identical to those manufactured by the conventional apparatus, it is possible to decrease the furnace size of the drying furnace and to achieve downsizing of the spray-drying apparatus.

According to the atomizer 6 of the present embodiment, the liquid reservoir part 15 reserving the slurry is included around the central portion of the rotary disk 14. The slurry is temporarily reserved in the liquid reservoir part 15 of the rotary disk 14 and ascends as uniformly spreading over the inclined surface 14*a*. As a result, it is possible to prevent deviation in the amount of the slurry centrifugally sprayed from the rotary disk 14. Further, the slurry ascends as uniformly spreading over the inclined surface 14*a* so that the particle size of the granulated particles to be manufactured may not be easily affected by changes in the amount of the slurry to be dropped from the nozzle part 10. Therefore, it is possible to prevent deviation in the particle size of the granulated particles to be manufactured.

Further, according to the spray-drying apparatus 2 and the method for manufacturing the granulated particles using the spray-drying apparatus 2, because the atomizer 6 is included, it is possible to prevent deviation in the particle size of the composite particles to be manufactured and to obtain the sharp particle size distribution.

Note that, in the above-mentioned embodiment, the rotary disk 14 illustrated in FIG. 2 has been described as an example. However, the following rotary disks are also applicable in place of the rotary disk 14. That is, a rotary disk 30, a rotary disk 32, a rotary disk 37, a rotary disk 42, and a rotary disk 50 respectively illustrated in FIG. 3, FIG. 4, FIG. 5, FIG. 7, and FIG. 14.

Figure 3:
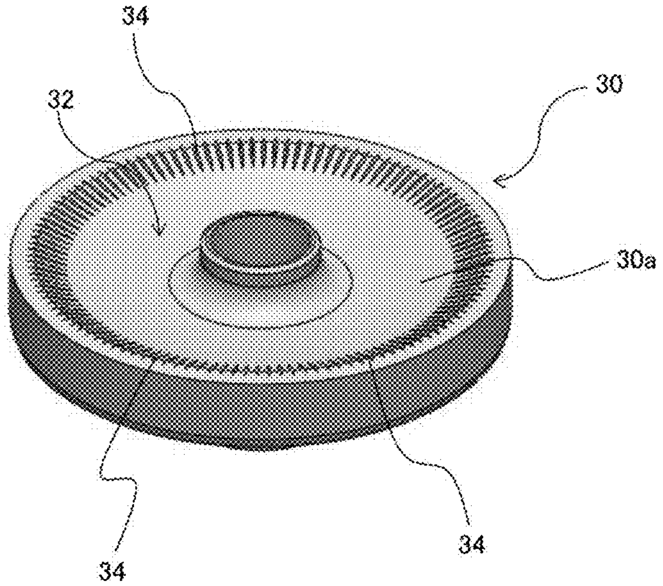
FIG. 3 is a view illustrating a configuration of another rotary disk according to the embodiment of the present invention.

As illustrated in FIG. 3, the rotary disk 30 has a disk-like shape and is formed with an annular inclined surface 30*a* in an upper surface of the rotary disk 30. The inclined surface 30*a* inclined in a radiation direction is formed around a central portion of the rotary disk 30 and has a predetermined angle relative to a horizontal direction. The inclined surface 30*a* is an annular inclined and curved surface ascending in the radiation direction from the central portion of the rotary disk 30. In other words, a part around the central portion in the upper surface of the rotary disk 30 is an annular concave portion surrounded by the inclined surface 30*a* and constitutes a liquid reservoir part 32 reserving the slurry dropped from the nozzle part 10. Further, in a periphery part of the inclined surface 30*a*, a plurality of grooves 34 stretching in the radiation direction is formed at regular intervals. Each groove 34 has a constant width and a constant depth as similar to the grooves 20. Further, a surface of the rotary disk 30 is coated with the water repellent ICF.

In a case of using the rotary disk 30, the slurry dropped on the upper surface in a vicinity of the central portion of the rotary disk 30 and temporarily reserved in the liquid reservoir part 32 of the rotary disk 30 ascends the inclined surface 30*a* by centrifugal force due to rotation of the rotary disk 30. The slurry ascending the inclined surface 30*a* passes through the grooves 34 formed in the periphery part of the inclined surface 30*a*. The slurry is then centrifugally sprayed by the centrifugal force due to the rotation of the rotary disk 30 in an upward direction at a predetermined angle relative to the horizontal direction.

The slurry temporarily reserved in the liquid reservoir part 32 of the rotary disk 30 ascends as uniformly spreading over the inclined surface 30*a* and is centrifugally sprayed through the grooves 34 from the periphery part of the inclined surface 30*a*. Therefore, an amount of the slurry centrifugally sprayed from the rotary disk 30 is stabilized, which leads to stabilize the particle size of the granulated particles to be manufactured in the spray-drying apparatus 2.

Further, the slurry temporarily reserved in the liquid reservoir part 32 of the rotary disk 30 ascends as uniformly spreading over the inclined surface 30*a*. Therefore, it is possible to control the particle size of the granulated particles by adjusting a height of the inclined surface 30*a* that constitutes the liquid reservoir part 32. In other words, heightening the inclined surface 30*a* decreases the size of the droplets of the slurry centrifugally sprayed from the rotary disk 30, which leads to achieve decrease in the particle size of the granulated particles to be manufactured. Further, even though the amount of the slurry to be dropped from nozzle part 10 is decreased, the slurry uniformly spreads over the inclined surface 30*a*. Therefore, it is possible to manufacture the granulated particles with small particle size. Furthermore, the slurry is centrifugally sprayed in the upward direction with the predetermined angle relative to the horizontal direction. Therefore, the distance till the slurry reaches the internal wall of the drying furnace 4 can be made long and the time of drying the droplets of the slurry can be made long.

Herein, a difference in the vertical direction between a position in the upper surface of the rotary disk 30 where the slurry is dropped from the nozzle part 10 and the highest position of the inclined surface 30*a* is preferably equal to or more than 1 mm. The reason is that if the difference is smaller than 1 mm, the slurry cannot uniformly spread over the inclined surface 30*a* but bursts out from rotary disk 30 in a form of a liquid, not a fine powder (mist), and adheres to the internal wall of the drying furnace 4 before dried inside the drying furnace 4 so that the composite particles cannot be obtained.

Figure 4:
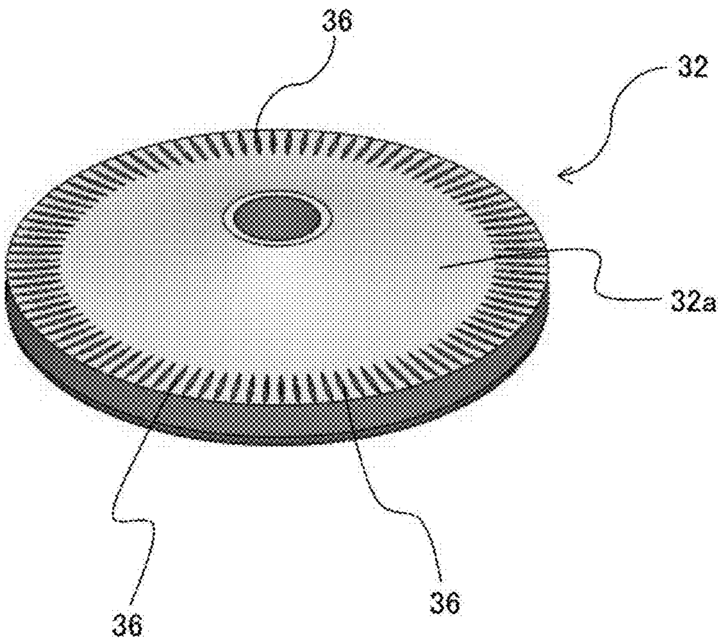
FIG. 4 is a view illustrating a configuration of another rotary disk according to the embodiment of the present invention.

As illustrated in FIG. 4, the rotary disk 32 has a disk-like shape and is formed with an annular inclined surface 32*a* in an upper surface of the rotary disk 32. The inclined surface 32*a* inclined in a radiation direction is formed around a central portion of the rotary disk 32 and has a predetermined angle relative to a horizontal direction. The inclined surface 32*a* is an annular inclined and curved surface descending from the central portion of the rotary disk 32 in the radiation direction. Further, in a periphery part of the inclined surface 32*a*, a plurality of grooves 36 stretching in the radiation direction is formed at regular intervals. Each groove 36 has a constant width and a constant depth as similar to the grooves 20. Further, a surface of the rotary disk 32 is coated with the water repellent ICF.

When the rotary disk 32 is provided, the slurry dropped on the upper surface in a vicinity of the central portion of the rotary disk 32 descends the inclined surface 32*a* by centrifugal force due to rotation of the rotary disk 32. The slurry descending the inclined surface 32*a* passes through the grooves 36 formed in the periphery part of the inclined surface 32*a* and is centrifugally sprayed in the horizontal direction or in a downward direction at a predetermined angle relative to the horizontal direction by the centrifugal force due to the rotation of the rotary disk 32. The slurry descends as uniformly spreading over the inclined surface 32*a* and is centrifugally sprayed through the grooves 36 from the periphery part of the inclined surface 32*a*. Therefore, an amount of the slurry centrifugally sprayed from the rotary disk 32 is stabilized, which leads to stabilize the particle size of the granulated particles to be manufactured in the spray-drying apparatus 2.

Herein, a difference in a vertical direction between a position in the upper surface of the rotary disk 32 where the slurry is dropped from the nozzle part 10 and the lowest position of the inclined surface 32*a* is preferably equal to or more than 1 mm. The reason is that when the difference is equal to or more than 1 mm, the slurry descends as uniformly spreading over the inclined surface 32*a* by force in the radiation direction due to the centrifugal force and by force in the downward direction due to gravity of the slurry. However, if the difference is smaller than 1 mm, the slurry descends without uniformly spreading over the inclined surface 32*a* but bursts out from the rotary disk 32 in a form of a liquid, not a fine powder (mist), and adheres to the internal wall of the drying furnace 4 before dried inside the drying furnace 4 so that the composite particles cannot be obtained.

Figure 5:
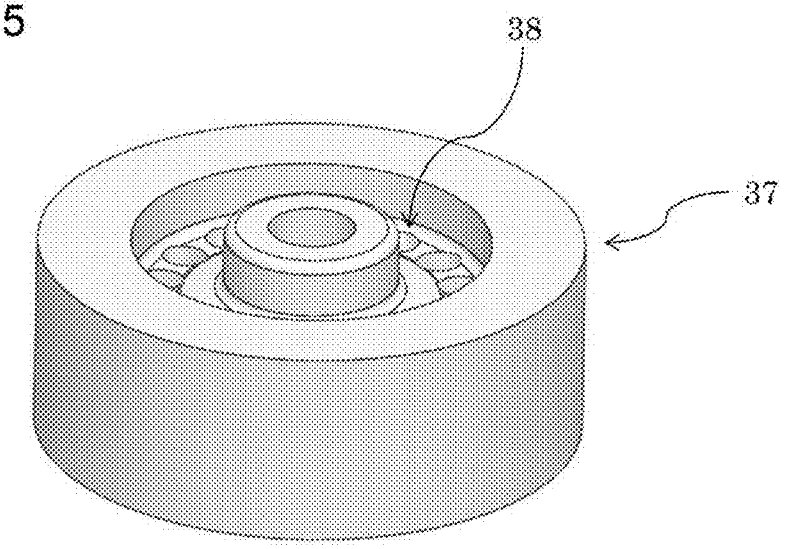
FIG. 5 is a view illustrating a configuration of another rotary disk according to the embodiment of the present invention.
Figure 6:
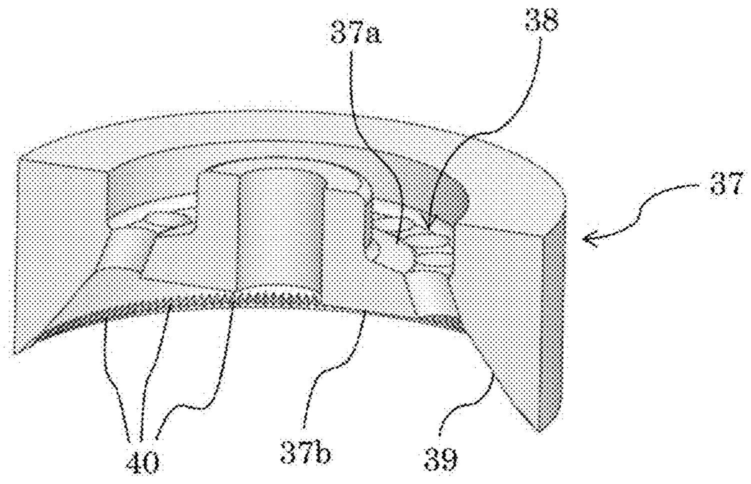
FIG. 6 is a cross-sectional view illustrating a configuration of another rotary disk according to the embodiment of the present invention.

As illustrated in FIG. 5, the rotary disk 37 has a disk-like shape and is formed with holes 38 in an upper surface of the rotary disk 37. Each hole 38 penetrates the rotary disk 37 from the upper surface to a back surface thereof. As illustrated in a cross-sectional view in the FIG. 6, a conically inclined surface 39 is formed in a bottom part of the holes 38. Further, in a periphery part of the inclined surface 39, a plurality of grooves 40 stretching in a radiation direction is formed at regular intervals. Each groove 40 has a constant width and a constant depth as similar to the grooves 20. Further, a surface of the rotary disk 37 is coated with the water repellent ICF.

When the rotary disk 37 is provided, the slurry dropped on the upper surface 37*a* in a vicinity of a central portion of the rotary disk 37 passes through the holes 38 by centrifugal force due to the rotation of the rotary disk 37 and gravity, flows into a back surface 37*b* of the upper surface 37*a* in the vicinity of the central portion, and descends the inclined surface 39. The slurry descending the inclined surface 39 passes through the grooves 40 formed in the periphery part of the inclined surface 39 and is centrifugally sprayed in a horizontal direction or in a downward direction at a predetermined angle relative to the horizontal direction by the centrifugal force due to rotation of the rotary disk 37. The slurry descends as uniformly spreading over the inclined surface 39 and is centrifugally sprayed through the grooves 40 from the periphery part of the inclined surface 39. Therefore, an amount of the slurry centrifugally sprayed from the rotary disk 37 is stabilized, which leads to stabilize the particle size of the granulated particles to be manufactured in the spray-drying apparatus 2.

Figure 7:
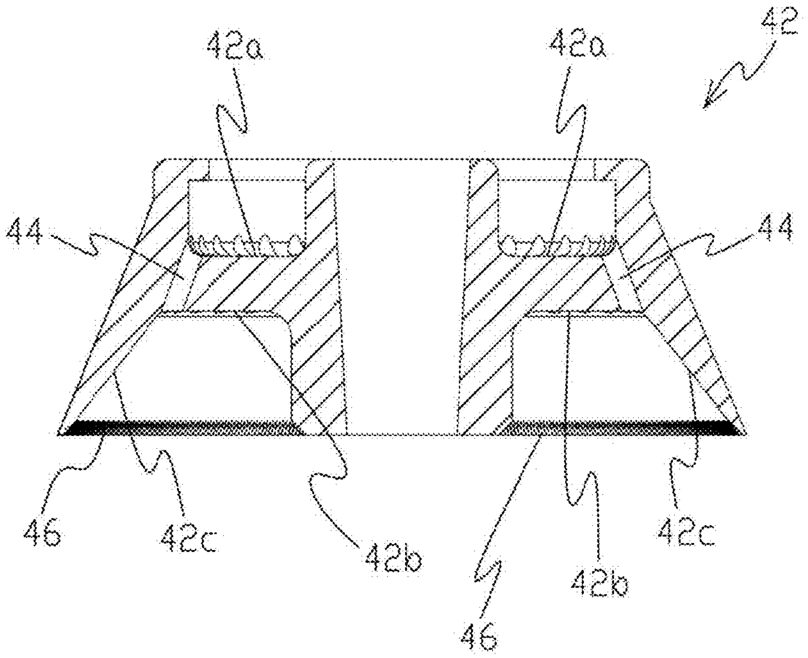
FIG. 7 is a cross-sectional view illustrating a configuration of another rotary disk according to the embodiment of the present invention.
Figure 8:
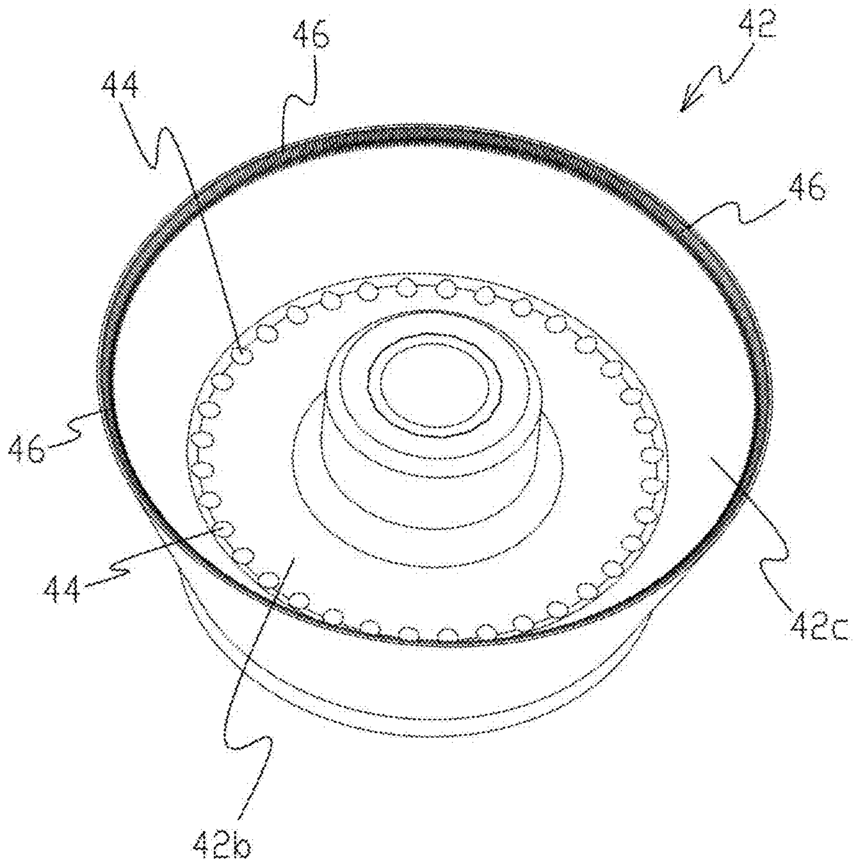
FIG. 8 is a perspective view illustrating a configuration of another rotary disk according to the embodiment of the present invention.

The rotary disk 42 has a conically trapezoidal shape as illustrated in a cross-sectional view of the FIG. 7. A surface of the rotary disk 42 is coated with the water repellent ICF. Further, in an upper surface of the rotary disk 42, an annular drop surface 42*a* is formed around a central portion of the rotary disk 42. FIG. 8 is a perspective view illustrating a configuration of the rotary disk 42 seen from a downward direction (a direction to see a back surface 42*b*). As illustrated in FIG. 7 and FIG. 8, thirty-six holes 44 are circumferentially arranged in the drop surface 42*a* of the rotary disk 42. Each hole 44 penetrates the rotary disk 42 from the drop surface 42*a* to the back surface 42*b*.

Herein, the thirty-six holes 44 are formed in the rotary disk 42. However, note that the holes formed in the rotary disk are normally twenty or more, and preferably twenty-four or more, and more preferably thirty or more. The reason is that if the number of the holes is less than 20, the slurry passing through the holes cannot spread uniformly over a spraying surface 42*c* (described below) of the rotary disk 42.

The slurry dropped on the drop surface 42*a* spreads uniformly over the drop surface 42*a* and passes through the holes 44. Note that, a size of each hole may not affect the yield of the composite particles to be manufactured by the spray-drying apparatus 2 and the particle size distribution. However, the size of each hole is preferably made small in order to maintain intensity of the rotary disk rotating at high speed. However, it should be noted that the size of each hole is preferably made at least equal to or more than 0.5 mm, more preferably equal to or more than 1 mm in order to prevent coagulated materials or coarse particles from clogging in the holes.

The annular back surface 42*b* and the conically inclined spraying surface 42*c* spraying the slurry are formed on a lower surface of the rotary disk 42. The back surface 42*b* is the annular surface parallel to a horizontal direction and is formed around a central bottom part of the rotary disk 42. The spraying surface 42*c* is the annular inclined surface disposed in an outer circumference of the back surface 42*b* and descending in a radiation direction from a periphery part of the back surface 42*b*.

Figure 9:
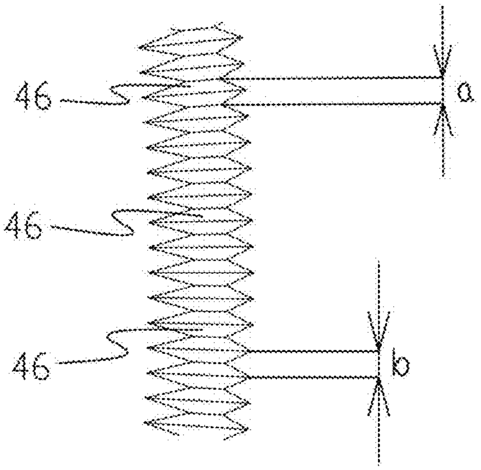
FIG. 9 is an enlarged view illustrating a configuration of grooves of another rotary disk according to the embodiment of the present invention.

Further, in a periphery part of the spraying surface 42*c*, a plurality of grooves 46 is formed in the radiation direction at regular intervals. Each groove 46 has a constant width and a constant depth as similar to the grooves 20. FIG. 9 is an enlarged sectional view illustrating the grooves 46. As illustrated in FIG. 9, the grooves 46 are formed so that each of adjacent grooves 46 is formed with no gap or with minimum gap. Specifically, the grooves 46 are formed so that a/b becomes equal to or more than 0.8, preferably equal to or more than 0.9, more preferably equal to or more than 0.95, where "a" is a width of each groove 46 and "b" is a pitch between the adjacent grooves 46. Therefore, the slurry uniformly spreading over the spraying surface 42*c* certainly passes through the grooves 46. As the whole slurry passing through the grooves 46, the size of the droplets of the slurry sprayed from the rotary disk 42 is stabilized. Accordingly, it is possible to stabilize the particle size of the granulated particles to be manufactured and to obtain the sharp particle size distribution.

When the rotary disk 42 is provided, the slurry dropped on the drop surface 42*a* of the rotary disk 42 passes through the holes 44 by centrifugal force due to rotation of the rotary disk 42 and gravity, flows into the back surface 42*b*, and descends the spraying surface 42*c*. The slurry descending the spraying surface 42*c* passes through the grooves 46 formed in the periphery part of the spraying surface 42*c* and is centrifugally sprayed in the horizontal direction or in a downward direction at a predetermined angle relative to the horizontal direction by the centrifugal force due to the rotation of the rotary disk 42. The slurry descends as uniformly spreading over the spraying surface 42*c* and is centrifugally sprayed through the grooves 46 from the periphery part of the spraying surface 42*c*. Therefore, an amount of the slurry centrifugally sprayed from the rotary disk 42 is stabilized, which leads to stabilize the particle size of the granulated particles to be manufactured in the spray-drying apparatus 2.

Figure 10:
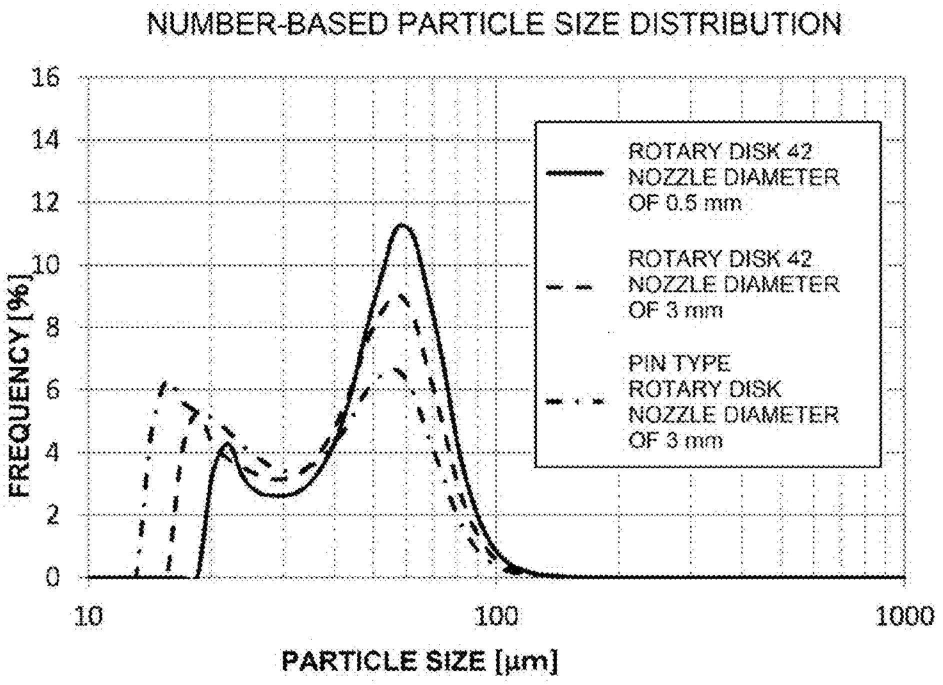
FIG. 10 is a graph illustrating number-based particle size distributions of the rotary disk according to the embodiment and a conventional rotary disk.
Figure 11:
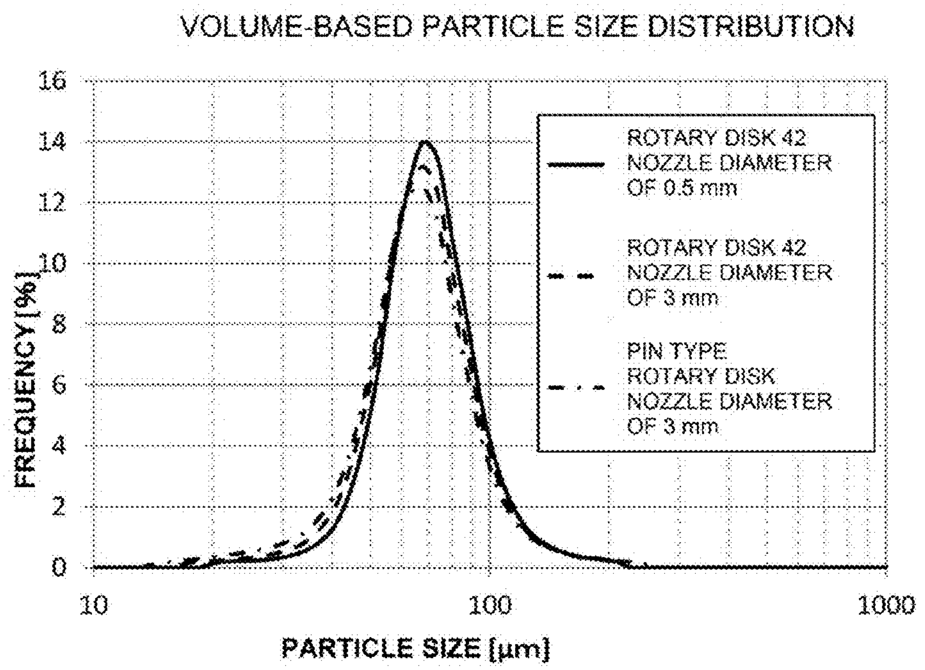
FIG. 11 is a graph illustrating volume-based particle size distributions of the rotary disk according to the embodiment and the conventional rotary disk.

FIG. 10 is a graph illustrating number-based particle size distributions ten minutes after manufacturing the granulated particles, with the rotation speed of the rotary disk of 14,000 rpm, (1) by the spray-drying apparatus 2 including the rotary disk 42 and the nozzle having the nozzle diameter of 0.5 mm, (2) by the spray-drying apparatus 2 including the rotary disk 42 and the nozzle having the nozzle diameter of 3 mm, and (3) by the spray-drying apparatus 2 including the conventional pin type disk and the nozzle having the nozzle diameter of 3 mm. FIG. 11 is a graph illustrating volume-based particle size distributions ten minutes after manufacturing the granulated particles with the same conditions as described in FIG. 10. As illustrated in the graphs (2) and (3) of FIG. 10 and FIG. 11, the sharp particle size distribution can be obtained by manufacturing the granulated particles with the rotary disk 42 rather than manufacturing the granulated particles with the conventional pin type disk. Further, as illustrated in the graphs (1) and (2) of FIG. 10 and FIG. 11, the sharp particle size distribution can be obtained by manufacturing the granulated particles with dropping the slurry from the nozzle having the nozzle diameter of 0.5 mm rather than manufacturing the granulated particles with dropping the slurry from the nozzle having the nozzle diameter of 3 mm.

Figure 12:
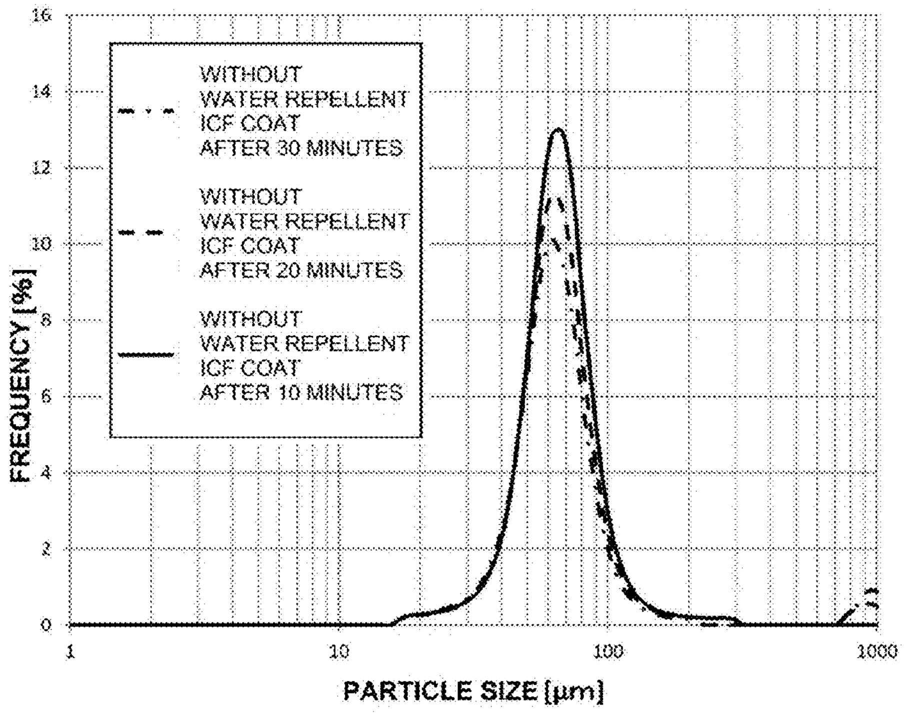
FIG. 12 is a graph illustrating volume-based particle size distributions of a rotary disk not coated with a water repellent ICF.
Figure 13:
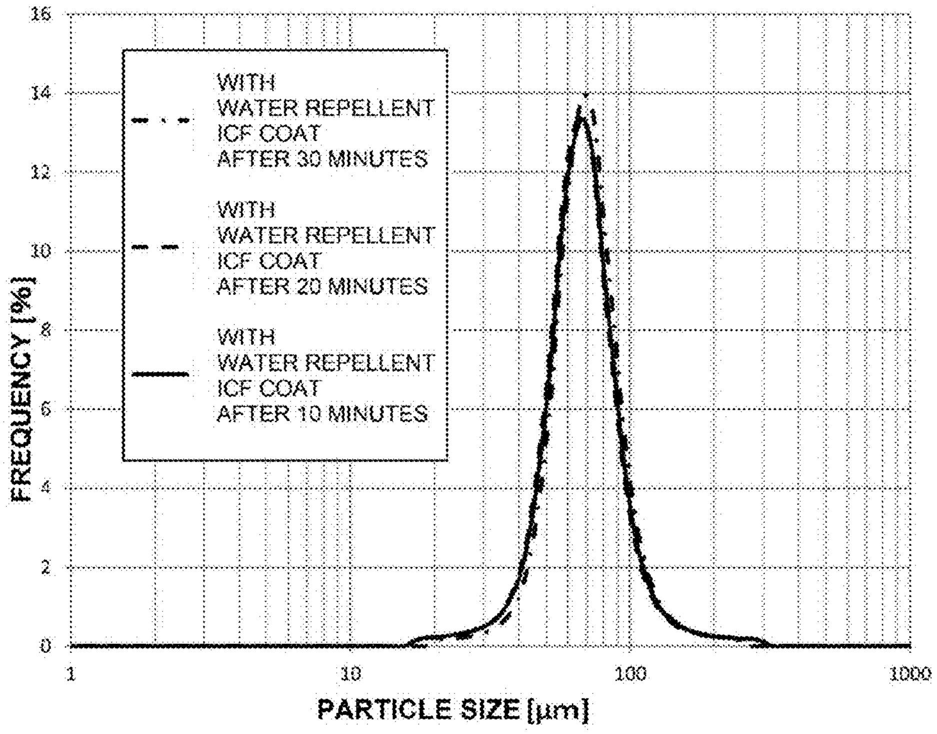
FIG. 13 is a graph illustrating volume-based particle size distributions of a rotary disk coated with the water repellent ICF.

Further, FIG. 12 is a graph illustrating (1) a volume-based particle size distribution ten minutes after, (2) a volume-based particle size distribution twenty minutes after, and (3) a volume-based particle size distribution thirty minutes after manufacturing the granulated particles by the spray-drying apparatus 2 including a rotary disk having a configuration similar to that of the rotary disk 42 except that it is not coated with the water repellent ICF (rotation speed of the rotary disk: 14,000 rpm). Further, FIG. 13 is a graph illustrating (1) a volume-based particle size distribution ten minutes after, (2) a volume-based particle size distribution twenty minutes after, and (3) a volume-based particle size distribution thirty minutes after manufacturing the granulated particles by the spray-drying apparatus 2 including the rotary disk 42 (the rotary disk coated with the water repellent ICF) (the rotation speed of the rotary disk: 14,000 rpm). As illustrated in the graphs in FIG. 12 and FIG. 13, the sharp particle size distribution can be continuously obtained by manufacturing the granulated particles using the rotary disk coated with the water repellent ICF rather than manufacturing the granulated particles using the rotary disk not coated with the water repellent ICF. In other words, the sharp particle size distribution can be continuously obtained by coating the rotary disk with the water repellent ICF and improving water repellency and abrasion resistance of the rotary disk, even though the spray-drying apparatus 2 is operated for a long time.

Figure 14:
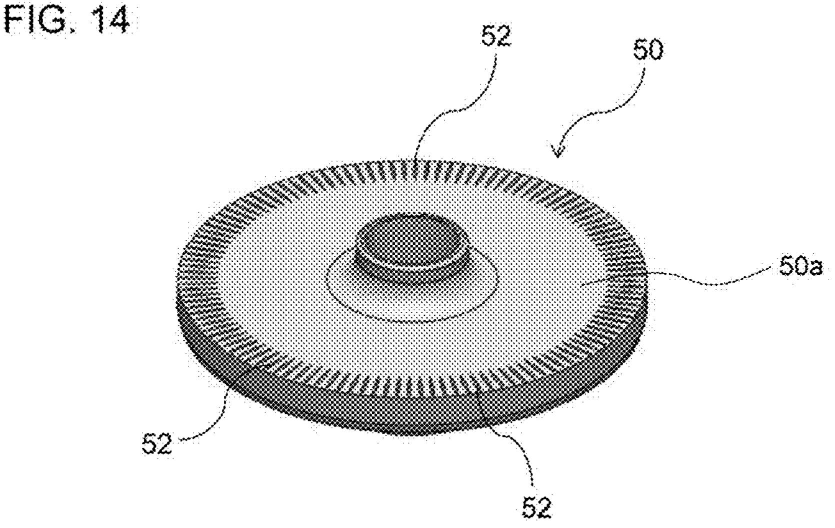
FIG. 14 is a view illustrating a configuration of the other rotary disk according to the embodiment of the present invention.

As illustrated in FIG. 14, the rotary disk 50 has a flat disk-like shape. In a periphery part of an upper surface 50*a* of the rotary disk 50, a plurality of grooves 52 stretching in a radiation direction is formed at regular intervals. Each groove 52 has a constant width and a constant depth as similar to the grooves 20. Further, a surface of the rotary disk 50 is coated with the water repellent ICF.

When the rotary disk 50 is provided, the slurry dropped on the upper surface in a vicinity of a central portion of the rotary disk 50 moves toward a periphery part of the upper surface 50*a* of the rotary disk 50 by centrifugal force due to rotation of the rotary disk 50. The slurry then passes through the grooves 52 formed in the periphery part and is centrifugally sprayed in a horizontal direction or in a downward direction at a predetermined angle relative to the horizontal direction by the centrifugal force due to the rotation of the rotary disk 50. As the slurry is centrifugally sprayed through the grooves 52, an amount of the slurry centrifugally sprayed from the rotary disk 50 is stabilized, which leads to stabilize the particle size of the granulated particles to be manufactured in the spray-drying apparatus 2.

Further, in the above-mentioned embodiment, the rotary disks 14, 30, 32, 37, 42, 50 respectively formed with the plurality of grooves 20, 34, 36, 40, 46, 52 in each periphery part of the surfaces 14*a*, 30*a*, 32*a*, 39, 42*c*, 50*a* where the slurry flows have been described as examples. However, it is possible to adopt a rotary disk formed with a plurality of grooves at regular intervals stretching in a radiation direction at least in a periphery part of a surface where the slurry flows, for example, a part other than the periphery part as well as in the periphery part.

Further, in the above-mentioned embodiment, the rotary disk 14 formed with the grooves 20 in the upper part of the inclined surface 14*b* (see FIG. 2) has been described as an example. However, it is possible to adopt a rotary disk formed with grooves in a periphery part of a surface other than the upper part of the inclined surface 14*b*, for example, in the bottom part or upper part of the inclined surface 14*a*, or in the connection part between the inclined surface 14*a* and the inclined surface 14*b*.

Further, in the above-mentioned embodiment, the surface of the rotary disk is coated with the water repellent ICF. However, it is possible to stably obtain uniform particles even under a long time of operation by polishing, plating, and coating the surface of the rotary disk. A method for polishing should not be limited. Examples of the method include buffing, grinding polishing, electrolytic polishing, and chemical polishing. Polishing makes each surface of the disk flat and smooth and prevents contamination. A preferable example of plating includes plating with materials (for example, alumite, chrome, and nickel) having abrasion resistance higher than materials (for example, aluminum) forming the rotary disk from a viewpoint that enhancing the hardness of the surface leads to prevent the abrasion. For example, it is preferable to plate a surface of the rotary disk with composite plating in which polytetrafluoroethylene (PTFE) is co-deposited in an electroless nickel film. Not only the water repellency, the mold release property, the slipping property, and the like which are the properties of the PTFE are improved but also the hardness of the film and the abrasion resistance can be improved with inclusion of the nickel. Further, by plating the rotary disk with the electroless nickel, a surface of the rotary disk can be coated without burying the grooves of the rotary disk.

Further, it is possible to prevent contamination by coating the rotary disk with water repellent coats or hydrophilic coats. For example, by coating the surface of the rotary disk with a mold release agent having the water repellency such as the PTFE and the like, the wettability of the slurry with respect to the rotary disk can be diminished so that the slurry can be prevented from fixing to the rotary disk. Furthermore, coating with the diamond-like carbon (DLC) can prevent the abrasion. In such manners, by coating the surface of the rotary disk with members having the water repellency, abrasion resistance, and the like, it is possible to prevent the slurry from fixing to the rotary disk and to continuously obtain the sharp particle size distribution even through the spray-drying apparatus is operated for a long time. Further, even under repetitive use of the rotary disk, physical properties of the granulated particles to be obtained are highly reproducible. In addition, it is possible to prevent foreign materials from getting mixed into the granulated particles due to the abrasion.

EXAMPLES

Example 1

97.5 parts of artificial graphite (average particle size: 24.5 μm, graphite interlayer distance (interplanar spacing (d value) of (002) plane by an X-ray diffraction method): 0.354 nm) as a negative electrode active material, 1.5 parts of the particulate binder resin in terms of solid content, and 0.7 parts of 1.0% aqueous solution of carboxymethylcellulose (BSH-12, manufactured by DKS Co. Ltd.) in terms of solid content as a water-soluble polymer were mixed. In addition, ion-exchanged water was added to the mixture so that a solid content concentration would be 35 wt. %. Thereafter, the resultant was mixed and dispersed, thereby obtaining the slurry for the composite particles.

The above-mentioned slurry for the composite particles (with the solid content concentration of 35%) is fed to a spray dryer (manufactured by Ohkawara Kakohki Co., Ltd.) by using the following disk as a rotary disk. That is, a doughnut-shaped disk as illustrated in FIG. 2 (a diameter of 50 mm, and a difference between a position on an upper surface in a vicinity of a central portion and the highest position of an inclined surface is 4 mm in a vertical direction) and including grooves (120 grooves with a width of 0.51 mm and a depth of 0.61 mm). The slurry was fed at 20 mL/min, with setting rotation speed of 15,000 rpm, hot air temperature of 150° C., and temperature of a particle recovery exit of 90° C. so as to carry out spray-drying granulation, thereby obtaining the composite particles.

The average particle size of the composite particles was measured by a dry laser diffraction/scattering type particle size distribution measuring apparatus (Microtrac MT-3200II, manufactured by Nikkiso Co., Ltd.). At this time, a value of (D90/D10) was written down on Table 1, where a cumulative 10% size in terms of volume was represented by D10 size and a cumulative 90% size in terms of volume was represented by D90 size.

Example 2

The composite particles were manufactured in the same manner as in Example 1 except for using a disk having a shape as illustrated in FIG. 3 (a diameter of 50 mm, and a difference between a position on an upper surface in a vicinity of a central portion and the highest position of an inclined surface is 3 mm in a vertical direction) and including grooves (120 grooves with a width of 0.39 mm and a depth of 0.48 mm) in place of the disk used in Example 1. A value (D90/D10) of the obtained composite particles was written down on the Table 1.

Example 3

In place of the disk used in Example 1, a disk as illustrated in FIG. 7 (an external diameter of 50 mm, thirty-six holes, and grooves each having a width of 0.3 mm and a depth of 0.2 mm) not coated with the water repellent ICF was used. A nozzle having a nozzle diameter (internal diameter) of 0.5 mm was used to feed liquid to the disk and rotation speed was set at 14,000 rpm. The composite particles were manufactured under a condition similar to that of Example 1 except for the above-mentioned conditions. Note that, the linear velocity herein of the nozzle part feeding the liquid was 102 m/min. Sampling was carried out ten minutes after starting operation. A value (D90/D10) of the obtained composite particles was 1.99.

Example 4

The composite particles were manufactured in the same manner as in Example 3 except that the disk used in Example 3 was coated with the water repellent ICF (manufactured by Nanotec Corporation) having a thickness of 1 μm. Sampling was carried out three times on the obtained composite particles at 20-minute intervals. Then, the particle size distribution of each time was measured. Values (D90/D10) of the obtained composite particles were written down on the Table 2.

Comparative Example 1

Figure 15:
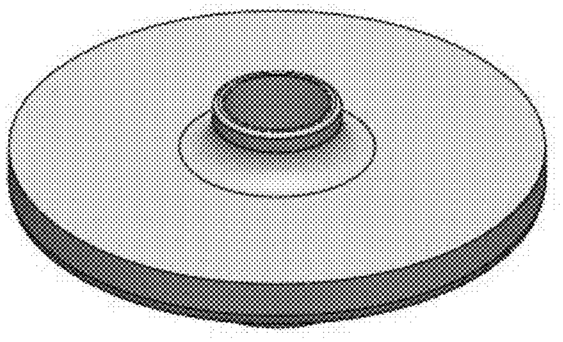
FIG. 15 is a view illustrating a configuration of a rotary disk according to Comparative Example 1.

The composite particles were manufactured in the same manner as in Example 1 except for using a disk as illustrated in FIG. 15 having a planar circular shape (a diameter of 50 mm) in place of the disk used in Example 1. Herein, particles with a fine particle size could not be obtained.

Comparative Example 2

Figure 16:
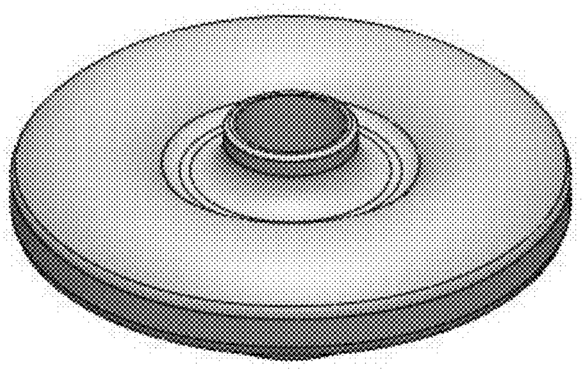
FIG. 16 is a view illustrating a configuration of a rotary disk according to Comparative Example 2.

The composite particles were manufactured in the same manner as in Example 1 except for using, in place of the disk used in Example 1, a doughnut-shaped disk as illustrated in FIG. 16 (a diameter of 50 mm, and a difference between a position on an upper surface in a vicinity of a central portion and the highest position of an inclined surface is 4 mm in a vertical direction) and including no grooves. A value (D90/D10) of the obtained composite particles was written down on the Table 1.

Comparative Example 3

The composite particles were manufactured in the same manner as in Example 1 except that a pin type disk (a diameter of 50 mm) was used in place of the disk used in Example 1. A value (D90/D10) of the obtained composite particles was written down on the Table 1.

TABLE 1

| | (D90/D10) in terms of volume |
|---|---|
| Example 1 | 1.98 |
| Example 2 | 1.83 |
| Example 3 | 1.99 |
| Comparative Example 1 | Could not granulated |
| Comparative Example 2 | 2.20 |
| Comparative Example 3 | 2.26 |

Example 4

TABLE 2

| | (D90/D10) in terms of volume |
|---|---|
| After 20 minutes | 2.00 |
| After 40 minutes | 2.06 |
| After 60 minutes | 2.09 |

As illustrated in the above-mentioned Examples, (D90/D10) of the composite particles used for manufacturing an electrode for an electrochemical device which are obtained by using the disk of the present invention is lower than that of composite particles which are obtained by using the conventional pin type disk. Therefore, it can be said that the particle size distribution obtained by using the disk of the present invention is sharp.

The invention claimed is:

1. An atomizer comprising:

a nozzle part dropping a slurry; and a rotary disk centrifugally spraying the slurry to be dropped from the nozzle part, wherein the rotary disk includes a plurality of grooves stretching in a radiation direction at least in a periphery part of a surface on which the slurry is sprayed, and a/b is equal to or more than 0.8, where “a” represents a width of each of the grooves and “b” represents a pitch of adjacent grooves.

2. The atomizer according to claim 1, wherein the rotary disk has a disk-like shape and includes an annular inclined surface inclined in a radiation direction, the inclined surface being formed around a central portion of the disk-like shape and having a predetermined angle relative to a horizontal direction.

3. The atomizer according to claim 2, wherein the rotary disk includes a liquid reservoir part reserving the slurry at least around a central portion of an upper surface of the disk-like shape.

4. The atomizer according to claim 1, wherein a surface which has the plurality of grooves is on an upper surface of the rotary disk.

5. The atomizer according to claim 1, wherein a surface which has the plurality of grooves is on a lower surface of the rotary disk, and the rotary disk includes twenty or more holes circumferentially arranged and penetrating from an upper surface of the rotary disk to the lower surface.

6. The atomizer according to claim 1, wherein each of the grooves has a width equal to or more than 50 μm and equal to or less than 5 mm and has a depth equal to or more than 50 μm and equal to or less than 5 mm.

7. The atomizer according to claim 2, wherein a linear velocity of the slurry to be dropped from the nozzle part is equal to or more than 50 m/min.

8. The atomizer according to claim 1, wherein the rotary disk is coated with a water repellent material.

9. The atomizer according to claim 1, wherein the rotary disk is coated with a water repellent material and a material having higher abrasion resistance than a material used for forming the rotary disk.

10. The atomizer according to claim 2, wherein a difference in a vertical direction between a position on which the slurry is dropped from the nozzle part and a lowest position of the inclined surface or a highest position of the inclined surface is equal to or more than 1 mm.

11. The atomizer according to claim 2, wherein the inclined surface is a curved surface.

12. The atomizer according to claim 3, wherein the liquid reservoir part is an annular concave portion.

13. The atomizer according to claim 2, wherein the slurry is a slurry for composite particles for dry molding used for manufacturing an electrode for an electrochemical device.

14. A spray-drying apparatus comprising:

the atomizer according to claim 1; and a drying furnace drying the slurry centrifugally sprayed from the atomizer.

15. A method for manufacturing composite particles using the atomizer according to claim 1, the method comprising:

a spraying step of centrifugally spraying a slurry for composite particles for dry molding used for manufacturing an electrode for an electrochemical device; and a drying step of drying the slurry centrifugally sprayed in the spraying step.

* * * * *